(12) United States Patent
Lavergne

(10) Patent No.: US 9,127,736 B2
(45) Date of Patent: Sep. 8, 2015

(54) WORKING DEVICE

(75) Inventor: Hans-Peter Lavergne, Trunkelsberg (DE)

(73) Assignee: Liebherr-Hydraulikbagger GmbH, Kirchdorf/Iller (DE)

(*) Notice: Subject to any disclaimer, the term of this patent is extended or adjusted under 35 U.S.C. 154(b) by 906 days.

(21) Appl. No.: 13/298,793

(22) Filed: Nov. 17, 2011

(65) Prior Publication Data

US 2012/0301256 A1    Nov. 29, 2012

(30) Foreign Application Priority Data

Nov. 17, 2010  (DE) .................. 10 2010 051 665

(51) Int. Cl.
| F16D 31/02 | (2006.01) |
| F16F 9/02 | (2006.01) |
| E02F 3/42 | (2006.01) |
| E02F 9/22 | (2006.01) |
| F16F 9/36 | (2006.01) |

(52) U.S. Cl.
CPC ............... *F16F 9/0209* (2013.01); *E02F 3/425* (2013.01); *E02F 9/2217* (2013.01); *F16F 9/36* (2013.01)

(58) Field of Classification Search
CPC .......... F16F 9/5126; F16F 9/48; F16F 9/182; F16F 9/096; B60G 2202/24; B64C 27/35; F15B 15/1409; F15B 15/1447

USPC .......... 60/371, 372; 188/322.16, 322.18, 316; 277/436, 437; 267/64.11, 64.13, 64.15, 267/64.26

See application file for complete search history.

(56) References Cited

U.S. PATENT DOCUMENTS

| 4,428,566 | A | * | 1/1984 | de Baan et al. ............ 267/64.15 |
| 4,483,141 | A |  | 11/1984 | Kobayashi et al. |
| 6,179,297 | B1 | * | 1/2001 | Bauman et al. ................ 277/437 |
| 8,418,451 | B2 | * | 4/2013 | Stanger et al. ................... 60/372 |

FOREIGN PATENT DOCUMENTS

| DE | 102008034582 | 1/2010 |
| EP | 1 319 465 A1 | 6/2003 |
| EP | 2 146 009 A1 | 1/2010 |
| EP | 2 148 014 A2 | 1/2010 |
| WO | 93/19301 | 9/1993 |
| WO | 2004/113622 A1 | 12/2004 |
| WO | 2006/005330 A1 | 1/2006 |

* cited by examiner

*Primary Examiner* — Edward Look
*Assistant Examiner* — Jason Mikus
(74) *Attorney, Agent, or Firm* — Dilworth & Barrese, LLP

(57) ABSTRACT

The present invention relates to a working device having an element movable via at least one working drive, with at least one energy recovery cylinder being provided for recovering energy from the movement of the movable element and having a chamber filled with gas. In this respect, the energy recovery cylinder has a sealing arrangement for sealing the chamber filled with gas which includes an annular space filled with oil.

17 Claims, 3 Drawing Sheets

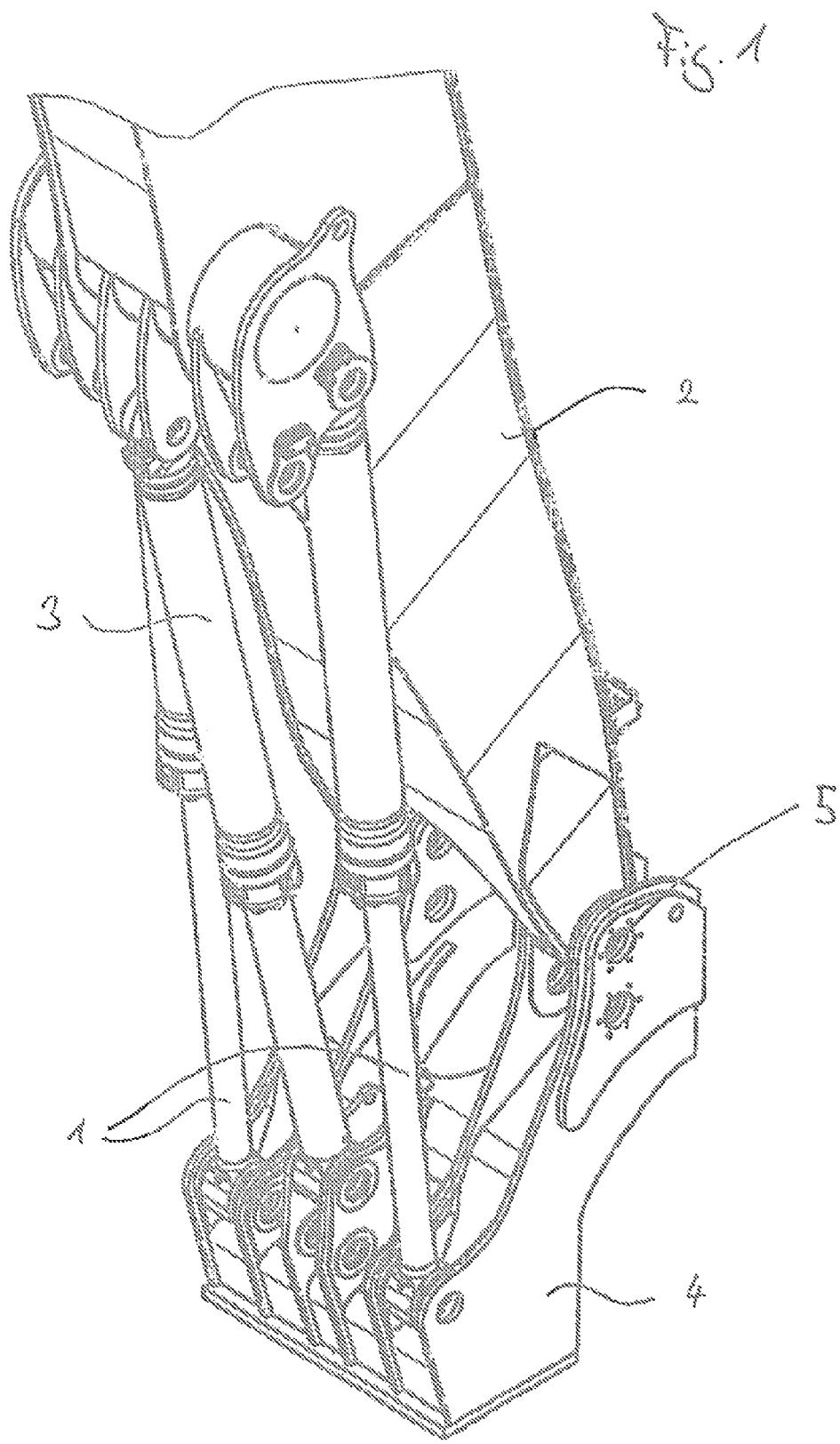

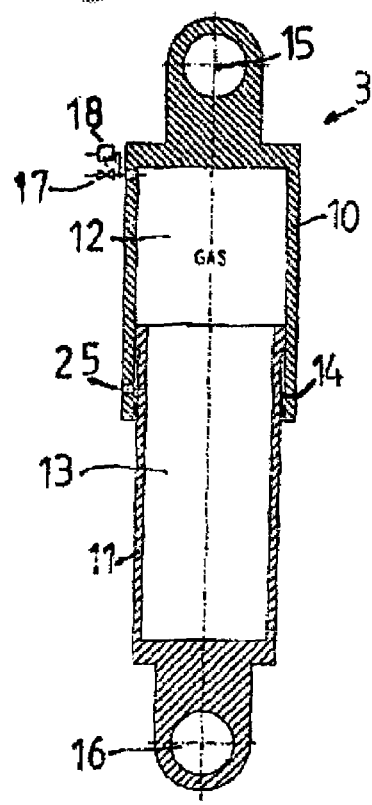
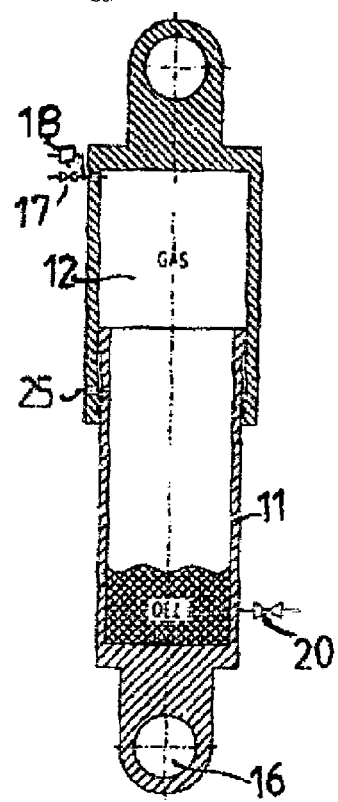

WORKING DEVICE

BACKGROUND OF THE INVENTION

The present invention relates to a working device having an element movable via at least one working drive, with at least one energy recovery cylinder being provided for recovering energy from the movement of the movable element and having a chamber filled with gas. The working device in accordance with the invention is in particular a movable working device, in particular an excavator or a machine for material handling. The working drive in particular includes a hydraulic working cylinder.

The chamber of the energy recovery cylinder filled with gas is compressed on a lowering of the movable element in such working devices and thus stores the potential energy in order to output it again on an upward movement of the movable element to support the working drive, in particular the hydraulic working cylinder.

A working device is known from DE 10 2008 034 582 A1 in which the chamber of the energy recovery cylinder filled with gas is formed by the base side of the energy recovery cylinder filled with gas and by the hollow piston rod of the energy recovery cylinder.

SUMMARY OF THE INVENTION

It is the object of the present invention to provide a working device having an energy recovery cylinder which has an improved sealing system of the chamber filled with gas.

This object is solved in accordance with the invention by a working device in accordance with the description herein. The present invention in this respect shows a working device, in particular a movable working device, in particular an excavator or a machine for material handling, having an element movable via at least one working drive, with at least one energy recovery cylinder being provided for recovering energy from the movement of the movable element and having a chamber filled with gas. The working drive in particular includes a hydraulic working cylinder. In accordance with the invention, in this respect a sealing arrangement is provided for sealing the chamber filled with gas which includes an annular space filled with oil. The oil cushion provided by the annular space filled with oil provides an additional barrier to a possible gas diffusion which has a substantially improved sealing effect.

The sealing arrangement furthermore advantageously includes a gas seal. A particularly good seal of the chamber filled with gas is effected by the combination of a gas seal and the annular space filled with oil. In this respect, the gas seal is advantageously arranged between the annular space filled with oil and the chamber filled with gas.

In a further advantageous manner, the sealing arrangement further includes a hydraulic seal. This prevents hydraulic oil from escaping from the annular space filled with oil. The hydraulic seal is in this respect advantageously arranged after the annular space filled with oil with respect to the chamber filled with gas. The hydraulic seal is thus in particular arranged between the annular space filled with oil and the outer space. The hydraulic seal can in this respect include one or more sealing arrangements, in particular sealing rings.

In a further advantageous manner, a communication passage is provided between the annular space filled with oil and the chamber filled with gas. Since it cannot be prevented in the operation of the energy recovery cylinder that gas moves into the annular space filled with oil, the communication passage provides a pressure equalization in accordance with the invention and allows the gas to escape from the annular space.

In this respect, a check valve is advantageously provided in the communication passage and is aligned with the opening direction of the annular space filled with oil to the chamber filled with gas. Gas can hereby escape from the annular space filled with oil into the chamber filled with gas, while it is prevented that gas is pressed out of the chamber filled with gas via the communication passage into the annular space. It can hereby be prevented that the oil is pressed out of the annular space.

In a further advantageous manner, the annular space filled with oil has a venting point at one side. Gas can advantageously escape from the annular space via this venting point.

The venting point is in this respect advantageously arranged at the highest position of the annular space. The venting point is thus arranged at a position at which the gas collects. In this respect, the energy recovery cylinder is arranged at the working device so that its longitudinal axis is arranged obliquely or horizontally at the working device; advantageously so that the longitudinal axis is arranged obliquely or horizontally in every working position. The venting point then advantageously extends in a radial direction upwardly from the annular space.

The communication passage, which was described above, in this respect advantageously connects the venting point of the annular space to the chamber filled with gas.

Provision is made in a further advantageous manner that the annular space filled with oil serves the lubrication of the energy recover cylinder. It in particular serves in this respect as an oil reservoir for lubricating the seals, scrapers and guide belts. The energy recovery cylinder in accordance with the invention can thus be operated without a connection to the hydraulic system.

The energy recovery cylinder of the present invention can in particular be designed as a one-sided cylinder having only one pressure space. This one pressure space is then filled with gas. The lubrication then takes place via the annular space filled with oil without the connection of a second cylinder space to the hydraulic system being necessary. If this is desired, the base side of the cylinder filled with gas can, however, be connected to the hydraulic system.

In a further advantageous manner, the energy recovery cylinder is filled with gas at the base side, with the sealing arrangement being arranged between the piston rod and the cylinder jacket.

In a further advantageous manner, the sealing arrangement is in this respect arranged at the cylinder jacket. The sealing arrangement is in this respect in particular arranged at the end of the cylinder jacket at its inner side. In this respect, the annular space filled with oil is in particular arranged at or in the cylinder jacket. Furthermore, annular spaces for the gas seal and/or for the hydraulic seal are advantageously provided in the cylinder jacket.

The present invention can in particular be used in an energy recovery cylinder whose piston rod is made hollow.

Guide elements for guiding the piston in the cylinder jacket, which are not sealing, are advantageously provided in accordance with the invention at the piston of piston rod. The thin annular space between the outer surface of the piston rod and the inner surface of the cylinder jacket is hereby in fluid communication with the base side filled with gas and thus allows a pressure equalization.

The communication passage in this respect advantageously connects the annular space filled with gas between the outer surface of the piston rod and the inner surface of the cylinder jacket to the annular space filled with oil.

In addition to the working device in accordance with the invention, the present invention furthermore includes an energy recovery cylinder for a working device as was described above. The energy recovery cylinder in accordance with the invention in this respect in particular has a chamber filled with gas, with a sealing arrangement for sealing the chamber filled with gas being provided which includes an annular space filled with oil.

In an advantageous manner, the energy recovery cylinder is in this respect designed as was presented in more detail above.

Particularly preferred possibilities of use of the present invention will now be briefly described again.

The working device in accordance with the invention is in particular a movable working device, in particular an excavator or a machine for material handling.

It has an element movable via at least one working drive, with at least one energy recovery cylinder being provided for recovering energy from the movement of the movable element. A hydraulic working cylinder is advantageously used as the working drive.

In this respect, the energy recovery cylinder serves with the chamber filled with gas itself as an energy store for the energy recovery from the movement of the movable element. The space formed by the base side of the energy recovery cylinder is in this respect advantageously filled with pressurized gas which is compressed on a movement of the piston rod toward the base. The energy stored in this process is then available again on an upward movement of the piston rod to support the working hydraulic cylinder. In a further advantageous manner, the piston rod of the energy recovery cylinder is hollow and open toward the base side so that the interior of the piston rod forms a part of the chamber filled with gas.

The movable element of the working device in accordance with the invention is advantageously pivotally connected to the working device pivotable about a vertical axis of rotation and is pivotable in a vertical pivoting plane via the working drive or drives. The movable element is in this respect in particular the arm of an excavator or the boom of a machine for material handling. Further advantageously, the mobile working device in this respect has an undercarriage with traveling gear and a superstructure arranged rotatably about a vertical axis of rotation thereon to which the movable element is pivotally connected.

In this respect, a piece of working equipment, for example a shovel or a grip, can be arranged at the movable element. On the lowering of the movable element, the potential energy of the movable element and of the piece of working equipment is stored via the energy recovery cylinder in order again to at least partly compensate the equipment weight on the upward movement of the movable element. Less energy hereby has to be applied via the working drives to move the movable element upwardly. The energy balance of the working device is hereby improved since less installed engine power is required and the fuel consumption is lowered.

The energy recovery cylinder in accordance with the invention is in this respect advantageously arranged like the working hydraulic cylinder or cylinders between a superstructure of the working device and the movable element. The energy recovery cylinder thus moves simultaneously with the working hydraulic cylinder on a movement of the movable element.

BRIEF DESCRIPTION OF THE DRAWINGS

The present invention will now be described in more detail with reference to embodiments and to drawings.

There are shown

FIG. 1 an embodiment of a working device in accordance with the invention with two working hydraulic cylinders and with one energy recovery cylinder;

FIG. 2a a schematic diagram of a first variant of the energy recovery cylinder in accordance with the invention;

FIG. 2b a schematic diagram of a second variant of the energy recovery cylinder in accordance with the invention;

DESCRIPTION OF THE PREFERRED EMBODIMENTS

Figure 3:
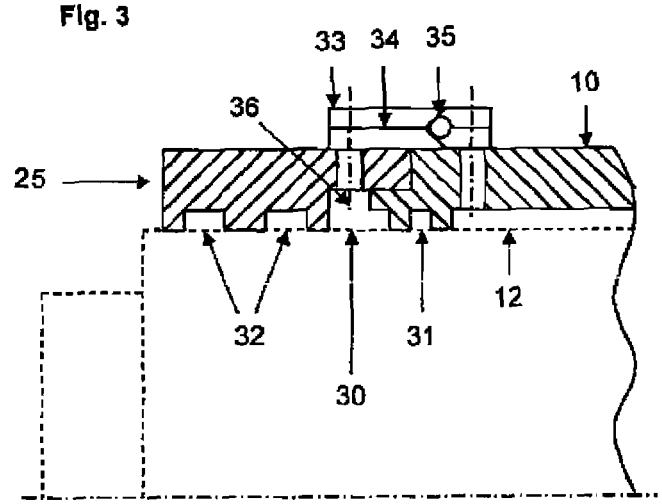
FIG. 3 a first embodiment of a sealing arrangement in accordance with the present invention.

An embodiment of a working device having an energy recovery cylinder in which the present invention can be used will now initially be described generally with reference to FIGS. 1 and 2.

The working device in this respect includes a movable element 2 which is pivotally connected via a horizontally extending pivot axle 5 to a welded construction 4 of the working device. The working device is in this respect a hydraulic excavator in which the movable element 2 is the excavator arm which is pivotally connected to the superstructure of the excavator. The superstructure itself is in this respect rotatably connected about a vertical axis of rotation to an undercarriage with a chassis.

To move the movable element 2, two working hydraulic cylinders 1 are provided in this respect which are pivotally connected via corresponding pivotal connection points to the movable element 2 as well as to the welded construction 4 of the superstructure. Furthermore, an embodiment of an energy recovery hydraulic cylinder 3 in accordance with the invention is provided which, like the working hydraulic cylinders 1, is arranged between the movable element 2 and the superstructure of the working device 4 and which serves the recovery of energy from the movement of the movable element. The energy recovery cylinder 3 is in this respect arranged between the two working hydraulic cylinders 1.

In this respect, a working tool, for example an excavator shovel, is arranged at the movable element 2, in this case the excavator boom. On the lowering of the movable element 2, the potential energy of the movable element as well as of the working tool should now be recovered and stored to at least partly compensate the static forces which would otherwise be exerted on the working hydraulic cylinders due to the weight of the movable element and of the working tool on the upward movement of the movable element and thus to have to supply less energy by means of the working hydraulic cylinder 1. The hydraulic cylinder in accordance with the invention advantageously has a chamber filled with gas for this purpose. On a lowering of the movable element, the gas in the chamber of the energy recovery cylinder filled with gas is compressed, whereas it expands on the raising of the movable element and in so doing supports the working hydraulic cylinder 1. For this purpose, the energy recovery cylinder in accordance with the invention is filled with gas at the base side and furthermore has a hollow piston rod open toward the base side.

Schematic drawings of two variants of an energy recovery cylinder 3 are now shown in FIGS. 2a and 2b. Both embodiments in this respect have a cylinder 10 in which a piston rod 11 is axially displaceably journalled. The piston rod 11 in this respect has the shape of a hollow cylinder so that a hollow space 13 results in the interior of the piston rod 11 and is open toward the base side 12 of the cylinder. The base side 12 of the energy recovery cylinder 3 and the hollow space 13 in the interior of the piston rod 11 in this respect form a connected chamber which is filled with pressurized gas. On a movement of the piston rod 11 in the cylinder 10, the size of the base side 12 changes so that the volume filled with gas substantially corresponds to the hollow space 13 in the interior of the hollow piston rod with a fully pushed in piston rod 11, but corresponds in contrast to the volume of this hollow space 13 plus the volume of the cylinder 10 with a fully pushed out piston rod.

The energy recovery hydraulic cylinder in this respect has a bearing lug 15 at the bottom side and a bearing lug 16 at the piston rod side with which it is pivotally connected to the piece of working equipment and to the moving element. The energy recovery cylinder is in this respect pivotally connected between the movable element and the working device so that the piston rod 11 is moved downward toward the base of the energy recovery cylinder by the weight of the movable element and of the working tool so that the gas volume is compressed. In this respect, due to the embodiment in accordance with the invention of the energy recovery cylinder with a hollow piston rod 11, sufficient gas volume is also present with a retracted cylinder to enable a shallow pressure increase on the lowering of the working tool. Conversely, on an upward movement of the movable element, part of the weight rests on the gas volume in the energy recovery cylinder so that the working hydraulic cylinders no longer have to apply the complete static load.

The energy recovery cylinder in accordance with the invention has a filling valve 17 for filling the chamber with gas and a pressure relief valve 18 for limiting the gas pressure. In the first embodiment in FIG. 2a, the filling valve 17 and the pressure relief valve 18 are arranged at the base side in this respect. In the second embodiment shown in FIG. 2b, the filling valve 17 and the pressure relief valve 18 are in contrast arranged at the piston rod side.

The energy recovery cylinders shown in FIGS. 2a and 2b are one-sided cylinders in which solely the chamber 12 filled with gas is provided as a pressure chamber and the piston rod 11 is supported at the end of the cylinder jacket 10 via a sealing arrangement 25. The base side can, however, have a connector via which it can be connected to a hydraulic system of the working device.

As shown in FIG. 2b, the gas volume in the energy recovery cylinder can be changed by the supply of oil to or the conducting of oil from the energy recovery cylinder. For this purpose, a connector 20 is provided in the second embodiment in FIG. 2b for the supply with oil via which the base space of the energy recovery cylinder can be connected to a hydraulic system of the working device.

Figure 4:
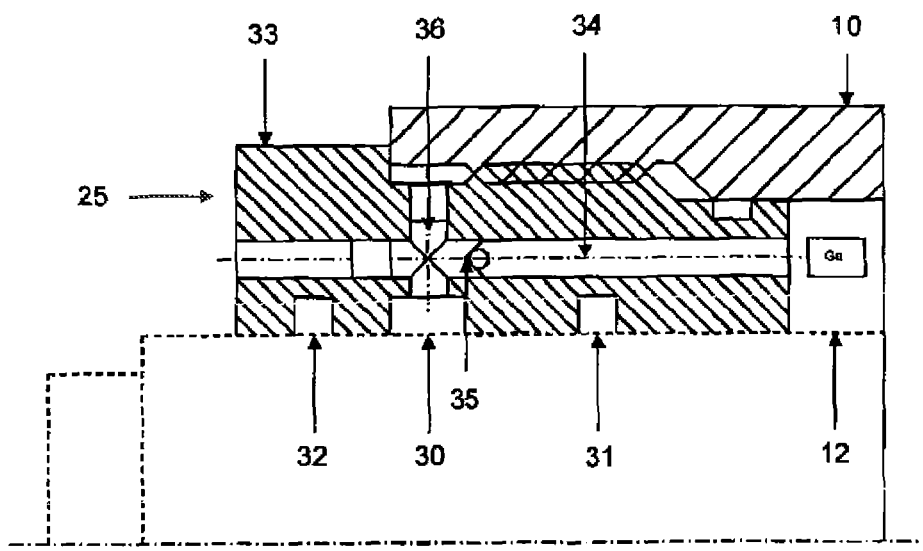
FIG. 4 a second embodiment of a sealing arrangement in accordance with the present invention.

In FIGS. 3 and 4, two embodiments of a sealing arrangement in accordance with the invention are now shown which can be used, for example, in the energy recovery cylinders shown above. The sealing arrangement in this respect in each case serves for the sealing of the chamber filled with gas and has an annular space 30 filled with oil. In this respect, a respective gas seal 31 is provided between the annular space 30 filled with oil and the chamber 12 filled with gas. On the other side of the annular space 30 filled with oil, in contrast, a hydraulic sealing package 32 is provided which can comprise one or more sealing regions.

The annular space 30 filled with oil in this respect in each case has a venting point 36 through which gas collecting in the annular space 30 can escape. The venting point 36 is in this respect connected via a communication passage 34 to the chamber 12 filled with gas. In this respect, a check valve 35 is arranged in this communication passage 34. It prevents gas being pressed out of the chamber 12 filled with gas via the connection line 34 into the annular space 36 and so pressing the hydraulic fluid out of this annular space. Conversely, gas can flow out of the annular space 36 into the chamber 12 filled with gas. The connection line thus provides a pressure equalization between the annular space and the chamber filled with gas.

The sealing arrangement 25 in accordance with the invention is in this respect arranged at the end of the cylinder jacket 10 in both embodiments. In this respect an annular space which is filled with gas and forms a part of the chamber 12 filled with gas is present subsequent to the sealing arrangement 25 in the interior of the cylinder jacket between the outer surface of the piston rod 11 and the inner surface of the cylinder jacket. This annular space filled with gas in this respect is advantageously in communication with the base side or with the hollow interior of the piston rod.

The communication passage 34 is in this respect advantageously arranged so that it connects the annular space 30 filled with oil to the annular space filled with gas between the outer surface of the piston rod and the inner surface of the cylinder jacket.

In the embodiment shown in FIG. 3, the annular space 30 filled with oil is arranged at the inner side of the cylinder jacket 10. The gas seal and the hydraulic sealing package are equally arranged there. They in this respect in particular form grooves in the cylinder jacket 10. The region of the cylinder jacket which contains the sealing arrangement can in this respect be made in one piece with the remaining cylinder jacket. Alternatively, it can also be a part piece of the cylinder jacket which is placed on.

The communication passage having the check valve 35 is in this respect formed in the embodiment shown in FIG. 3 by a valve block which is placed outwardly onto the cylinder jacket 10 and is connected on one side to the venting point 36 and on the other side to the chamber 12 filled with gas. This takes place by bores through the cylinder jacket.

In the embodiment shown in FIG. 4, in contrast, an annular element 33 is provided which is arranged at the end of the cylinder jacket 10 and forms, with its inner surface, a projecting step to the inner surface of the cylinder jacket. The chambers for the annular space 30 filled with oil, the gas seal 31 and the hydraulic seal 32 are arranged at this inner surface. The passages for the venting point 36, the communication passage 34 and the check valve 35 arranged therein are furthermore provided in the annular element 33. The venting passage in this respect extends parallel to the cylinder axis through the step in the annular space between the outer surface of the piston rod and the inner surface of the cylinder jacket 10.

The energy recovery cylinder is in this respect arranged at the working device such that it is aligned obliquely or horizontally and the venting point 36 is arranged such that it is located at the highest point of the annular space 30. The venting point in this respect extends away from the ring space 14 in the radial direction. The gas thus collects at the venting point 36 and can escape.

The oil cushion in accordance with the invention between the sealing package and the gas chamber thus forms, in addition to the installed sealing elements, a barrier to a possible gas diffusion.

It can, however, not be prevented in operation that gas moves into the annular space filled with oil. A valve block is therefore installed between the annular space filled with oil and the gas chamber. It is arranged at a point at which the gas collects. The valve block having the installed check valve serves always to hold the chambers (oil/gas) in pressure equalization. It is prevented by the check valve that oil is pressed into the gas space and the oil chamber empties.

The energy recovery cylinder in accordance with the invention can in this respect be operated without hydraulic oil since the oil reservoir serves as lubrication for the seal, scrapers and guide belts.

The invention claimed is:

1. A working device comprising
   at least one working drive,
   an element moveable via the at least one working drive,
   at least one energy recovery cylinder for recovering energy from a movement of the movable element, said at least one energy recovery cylinder comprising a chamber filled with gas, and
   a sealing arrangement for sealing the chamber filled with gas, wherein said sealing arrangement comprises an annular space filled with oil
   wherein the sealing arrangement further includes a gas seal which is arranged between the annular space filled with oil and the chamber filled with gas.

2. The working device of claim 1, wherein the sealing arrangement further includes a hydraulic seal which is arranged after the annular space filled with oil with respect to the chamber filled with gas.

3. The working device of claim 1, further comprising a communication passage whereby the annular space filled with oil is in fluid communication with the chamber filled with gas.

4. The working device of claim 3, further comprising a check valve is arranged in the communication passage and aligned with the opening direction of the annular space filled with oil to the chamber filled with gas.

5. The working device of claim 1, wherein the annular space filled with oil comprises a venting point on one side and wherein the venting point is advantageously arranged at the highest position of the annular space.

6. The working device of claim 3, wherein the annular space filled with oil comprises a venting point on one side and wherein the venting point is advantageously arranged at the highest position of the annular space and the communication passage connects the venting point to the chamber filled with gas.

7. The working device of claim 1, wherein the energy recovery cylinder is a one-sided cylinder with only one pressure space.

8. The working device of claim 1, wherein a base side of the energy recovery cylinder is filled with gas and the sealing arrangement is provided between a piston rod of the energy recovery cylinder and a cylinder jacket of the energy recovery cylinder.

9. The working device of claim 1, wherein the sealing arrangement further comprises a hydraulic seal arranged after the annular space filled with oil with respect to the chamber filled with gas.

10. The working device of claim 9, further comprising a communication passage whereby the annular space filled with oil is in fluid communication with the chamber filled with gas.

11. The working device of claim 2, further comprising a communication passage whereby the annular space filled with oil is in fluid communication with the chamber filled with gas is provided between the annular space filled with oil and the chamber filled with gas.

12. The working device of claim 1, further comprising a communication passage whereby the annular space filled with oil is in fluid communication with the chamber filled with gas space filled with oil and the chamber filled with gas.

13. The working device of claim 12, wherein a check valve is arranged in the communication passage and is aligned with the opening direction of the annular space filled with oil to the chamber filled with gas.

14. The working device of claim 11, wherein a check valve is arranged in the communication passage and is aligned with the opening direction of the annular space filled with oil to the chamber filled with gas.

15. The working device of claim 10, wherein a check valve is arranged in the communication passage and is aligned with the opening direction of the annular space filled with oil to the chamber filled with gas.

16. The working device of claim 15, wherein the annular space filled with oil comprises a venting point on one side and wherein the venting point is arranged at the highest position of the annular space.

17. The working device of claim 14, wherein the annular space filled with oil comprises a venting point on one side and wherein the venting point is arranged at the highest position of the annular space.

* * * * *